United States Patent
Tran et al.

(10) Patent No.: US 10,810,219 B2
(45) Date of Patent: Oct. 20, 2020

(54) TOP-K PROJECTION

(71) Applicant: MICRO FOCUS LLC, Santa Clara, CA (US)

(72) Inventors: Hoa Binh Nga Tran, Cambridge, MA (US); Charles Edward Bear, Cambridge, MA (US); Jaimin Mukesh Dave, Cambridge, MA (US); Vivek Bharathan, Cambridge, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 864 days.

(21) Appl. No.: 15/317,044

(22) PCT Filed: Jun. 9, 2014

(86) PCT No.: PCT/US2014/041582
§ 371 (c)(1),
(2) Date: Dec. 7, 2016

(87) PCT Pub. No.: WO2015/191033
PCT Pub. Date: Dec. 17, 2015

(65) Prior Publication Data
US 2017/0132295 A1 May 11, 2017

(51) Int. Cl.
*G06F 16/248* (2019.01)
*G06F 16/2455* (2019.01)
*G06F 16/2457* (2019.01)

(52) U.S. Cl.
CPC ...... *G06F 16/248* (2019.01); *G06F 16/24554* (2019.01); *G06F 16/24578* (2019.01)

(58) Field of Classification Search
CPC .................................................. G06F 16/248
See application file for complete search history.

(56) References Cited

U.S. PATENT DOCUMENTS

| | | | |
|---|---|---|---|
| 6,622,138 B1 * | 9/2003 | Bellamkonda | .... G06F 16/24537 |
| 6,934,929 B2 | 8/2005 | Brist et al. | |
| 8,543,589 B2 | 9/2013 | KHorlin et al. | |
| 9,251,155 B1 * | 2/2016 | Galimberti | ................ G06F 7/36 |
| 2004/0002973 A1 | 1/2004 | Chaudhuri et al. | |
| 2004/0249831 A1 | 12/2004 | Fagin et al. | |
| 2006/0212429 A1 | 9/2006 | Bruno et al. | |
| 2010/0131490 A1 * | 5/2010 | Lamb | ................ G06F 16/24542 707/714 |
| 2011/0213766 A1 | 9/2011 | Hong et al. | |
| 2012/0191642 A1 | 7/2012 | George | |
| 2013/0013659 A1 | 1/2013 | Kankar et al. | |
| 2017/0185649 A1 * | 6/2017 | Tran | .................. G06F 16/24556 |
| 2017/0293656 A1 * | 10/2017 | Kaur | ................. G06F 16/24545 |

OTHER PUBLICATIONS

Deutch, D. et al, "TOP-K Projection Queries for Probabilistic Business Processes", (Research Paper), Mar. 23-25, 2009, 13 pages.
(Continued)

*Primary Examiner* — Dawaune A Conyers (57) ABSTRACT

In an example, a top-k function is associated with a top-k projection for a data storage system. Input data to be loaded into the data storage system is divided and ranked according to the top-k function and stored in the top-k projection.

20 Claims, 6 Drawing Sheets

(56) References Cited

OTHER PUBLICATIONS

Deutch, D. et al., "Optimal Top-k Query Evaluation for Weighted Business Processes", (Research Paper), Sep. 13-17, 2010, 12 pages.
International Search Report & Written Opinion received in PCT Application No, PCT/US2014/041582, Jan. 30, 2015, 9 pages.
Ladwig, G. et al., "Index Structures and Top-k Join Algorithms for Native Keyword Search Databases", (Research Paper), Oct. 24-28, 2011, 10 pages.

* cited by examiner

TOP-K PROJECTION

BACKGROUND

In traditional database architectures, data is stored in database tables. Additionally, structures such as indexes are created for improved query performance.

When a query is received, the database tables are searched for matching results. Instead of having to read every record in a database table to search for matches, which can take a significant amount of time especially for large tables, indexes may be used to reduce the search time for identifying records matching the query.

Indexing is a way of sorting records on a field or multiple fields. Creating an index on a field in a database table creates another data structure which may hold, for each field value, a pointer that points to its related record. The index is sorted, so a faster search can be performed on the index, which typically does not require accessing every record stored in the database table.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

According to an example, a database storage system can create and store data in top-k projections, and run queries on top-k projections. The database storage system performs database functions, such as storing data, running queries on the stored data, etc. The top-k projections and other projections used by database storage system may be used instead of indexes to optimize query execution.

The data storage system stores data in projections. A projection is an optimized collection of table columns that provide physical storage for data. A projection is a data structure that can contain one, some or all of the columns of one or more database tables and the projections contain the actual data of the columns, which may be compressed. A projection that contains all of the columns of a database table is called a super projection. Even though projections are used, the database schema, e.g., identifying fields (i.e., columns), foreign keys, primary keys, etc., is supported by the projections. Also, the database storage system can execute standard database commands but the execution of the commands is performed on the projections rather than on typical database tables.

As indicated above, a projection is an optimized collection of table columns. Optimization refers to the improvement of performance of database function, such as storage, query execution, etc. For example, columns can be selected for a projection to improve the speed of executing a query.

A top-k projection is a projection that stores pre-computed top-k rows of values from each partition of rows of a table that may include many partitions of rows. In many application domains, users may be interested in a certain number of the highest ranking (i.e., top-k) rows from a potentially huge data space. Accordingly, the top-k function may return a k number of the highest ranking rows in response to a user query. The highest ranking rows may be identified from each partition of rows based on a score or rank assigned to the rows by a scoring function, for instance.

The data storage system supports the following functions for top-k projections: creating a top-k projection; insert and copy (bulk load) data into a top-k projection; select data from a top-k projection; update data of a top-k projection; delete data from a top-k projection and drop a partition of a top-k projection; merge data of a top-k projection that is stored in different physical containers; refresh data for a top-k projection; recover data for a top-k projection after a node of a cluster is down and then brought back up; rebalance data of a top-k projection when new nodes are added to a cluster of nodes of the data storage system; and backup and recovery of data.

A top-k projection can store results of a top-k function in a column of the top-k projection. The top-k function may be based on a predetermined query that is commonly executed for a user. The results of the top-k function can be stored in the column prior to receiving the predetermined query. Accordingly, when a query is received that is based on the top-k function, the results can be quickly provided to the user from the top-k projection. Thus, query execution performance is improved, i.e., faster.

The data storage system for example does not use indexes and traditional database tables to store data and run queries, such as in a conventional database management system. Instead, the projections, including the top-k projections, are used to store data and run queries. For example, instead of storing a database table including rows of data, the data storage system stores the data in a super projection and other projections, and executes queries on the projections. Execution of queries on projections may be faster than using indexes and database tables to execute the queries if the projections are optimized for the queries. Also, the data storage system does not need to waste storage on indexes.

Figure 1:
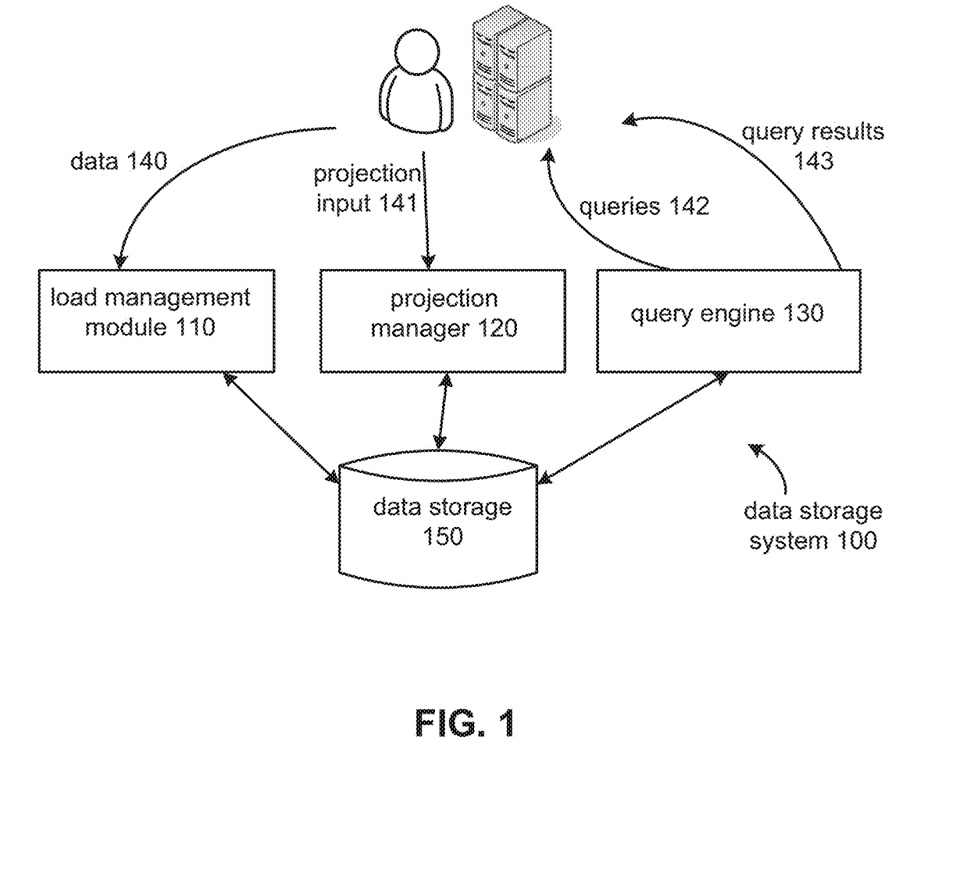
FIG. 1 shows a block diagram of a data storage system, according to an example of the present disclosure.

FIG. 1 is an example of a data storage system 100 that uses projections, including top-k projections, to execute database functions, including storing data and running queries. The data storage system 100 includes a load management module 110, a projection manager 120 and a query engine 130. The data storage system 100 also includes data storage 150 to store projections including data 140, a, projection catalog, and other information used by the data storage system 100. The data storage 150 may include disks, memory and/or other types of storage mediums.

Computers or users may provide data 140 for storage in projections in the data storage system 100, provide projection input 141 for creating or modifying projections, send queries 142, and get query results 143 from the data storage system 100. For example, the load management module 110 receives the data 140 and stores the data in the corresponding projections. A traditional relational database has at least one table including columns for storing data. One or more projections, including columns of the table, instead of traditional database tables and indexes. However, information about the database schema, tables for the schema, projections, etc., may be stored in the data storage system 100 so the data storage system 100 can identify and store data in the corresponding projections and run queries on the projections that optimize query performance.

When an instruction or command is received to load the data 140 into a table, the load management module 110 stores the data in the projections. For example, the data storage system 100 supports conventional database languages, such as structured query language (SQL). The load management module 110 receives a SQL load command to load data into a table, such as INSERT (row by row) or COPY (bulk load a set of rows) command, and loads the data in the projections. Received data is loaded into a super projection, which includes all the columns of the database table, and is loaded into other projections. The load management module 110 directs the appropriate data of columns to the right target projections. For example, a projection catalog stored in the data storage 150 stores information about each projection in the data storage system, including the columns of each projection. The load management module 110 directs the appropriate data of columns to the right target projections based on descriptions of the projections in the projection catalog.

For example, the load management module 110 performs expression evaluation on received load commands through the operator ExprEval to load data into the projections. For normal projections, the ExprEval operator directs the columns to the right order. For top-k projection, the ExprEval operator may also computes expressions and then passes the expressions to a top-k operator, which retrieves the top-k rows from a partition of rows of a table and passes the top-k rows to the target top-k projection. In one example, the top-k function is calculated on the received data to be inserted or bulk-loaded into the projections rather than on both the received data and the data already in the projections. For example, the existing data in the top-k projection is not combined with the received data to be inserted or bulk-loaded into the top-k projection. Thus, the top-k projection may store rows that are not in the top-k; such rows are filtered out when data is queried.

The query engine 130 receives queries 142 which may be in SQL and executes the queries on the stored projections to return query results 142. For example, a user or system submits a query to the data storage system 100. The query engine 130 parses the query and chooses the best projection (s) for the query by referencing the projection catalog. For example, the projection catalog 300 stores information about the projections and their columns, including user, schema, table, and projection information. A projection may be identified that already stores the query results in a column. For example, a particular top-k projection has columns storing results for a top-k function. If the query is requesting the same top-k data stored in the column, the query engine 130 runs the query on the top-k projection. If no projection is optimized for the received query, the query may be executed on the super projection. The query results are returned to the system or end user that sent the query.

The projection manager 120 creates and manages projections and stores information about the projections in the projection catalog. Projection input 141 may be provided by a user or system. The projection input 141 may include commands for creating or modifying projections. The projection manager 120 creates or modifies the projections according to the commands, and updates the projection catalog if needed.

Figure 2:
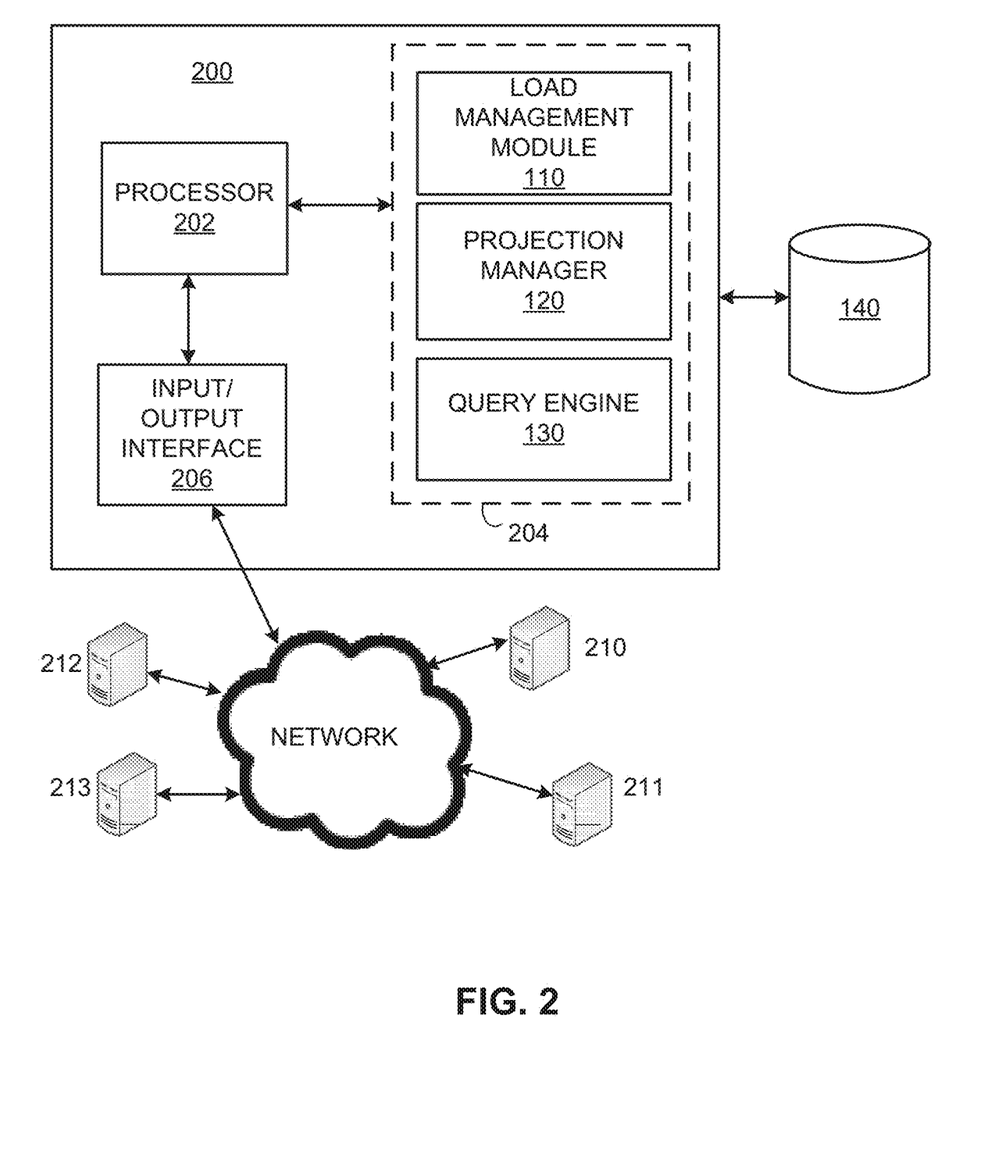
FIG. 2 shows a block diagram of a computer platform for the data storage system, according to an example of the present disclosure.

FIG. 2 illustrates a block diagram of computer 200, including hardware and a non-transitory computer readable medium that may be used as a platform for the data storage system 100.

For example, the computer 200 includes a processor 202, a data storage device 204, and an input/output interface 206. In one example, the computer is a server but other types of computers may be used. Also, the components are shown in a single computer as an example and in other examples the components may exist on multiple computers and the components may comprise multiple processors, data storage devices, interfaces, etc.

The data storage device 204 may include a hard disk, memory, etc. The data storage 204 may store any data used by the data storage system 100. The processor 202 may be a microprocessor, a micro-controller, an application specific integrated circuit (ASIC), field programmable gate array (FPGA), or other type of circuit to perform various processing functions.

In one example, the data storage system 100 includes machine readable instructions stored on a non-transitory computer readable medium, such as the data storage device 204, and executed by the processor 202 to perform the functions of the data storage system 100. For example, the load management module 110, projection manager 120 and query engine 130 may include machine readable instructions stored on the data storage device 204 as shown in FIG. 2. In another example, the data storage system 100 includes a customized circuit, such as an application-specific integrated circuit (ASIC) or field-programmable gate array (FPGA) to perform a function or multiple functions of the load management module 110, projection manager 120 and query engine 130.

The input/output (I/O) interface 206 comprises a hardware and/or a software interface. The I/O interface 206 may be a network interface connected to a network, such as the Internet, a local area network, etc. The data storage system 100 may receive data and user-input through the I/O interface 206. The data storage system 100 may be connected to the data storage 150, which may be provided on the computer 200 or on a separate computer.

The computer 200 may be a node of a distributed data storage system. For example, the computer 200 may be part of a cluster of nodes that services queries and provide data storage for multiple users or systems, and the nodes may communicate with each other to service queries and store data. The computer 200 and nodes 201-204 are shown as connected via network 220. Nodes may provide data redundancy to minimize down time in case of a node failure.

The data storage system 100 may receive an instruction (e.g., SQL statement) to create a table, tab1, with columns of different data types. An example of the statement is shown below. The columns in the table are id, f, i, c, v, and d. The table is partitioned on the year of column d.

| Table Create Statement |
| --- |
| CREATE TABLE tab1 |
| (id INT PRIMARY KEY, |
| f FLOAT, |
| i INT, |
| c CHAR, |
| v VARCHAR, |
| d TIMESTAMP not null) |
| PARTITION BY EXTRACT (YEAR FROM d); |

The projection manager 120, shown in FIG. 1, creates a super projection for the table that includes all the columns. A user or system may set parameters for sorting, segmenting and storing the super projection in particular nodes. Below are examples of statements for creating two super projections, sp1 and sp2, segmented on columns (i) and (c, i) respectively. SELECT indicates the columns. All the columns are provided in the super projection but the order of the columns in the projection may be specified by listing the columns. FROM indicates the table having the columns. ORDER BY may be used to specify the sort field for sorting the rows in the projection. Partitioned rows may be provided in their own container per partition. For example, if partitioned on year, all rows for a year may be provided in a corresponding storage container.

Super Projection Create Statements
CREATE PROJECTION sp1 AS
SELECT i, c, v, d, f, id FROM tab1 ORDER BY id SEGMENTED BY HASH(i) ALL NODES;
CREATE PROJECTION sp2 AS
SELECT * FROM tab1 SEGMENTED BY HASH(c, i) ALL NODES KSAFE1;

3. Examples of Top-K Query, Top-K Projection Creation and Population

The data storage system 100 may receive a top-k query or function (e.g., an SQL statement) to retrieve the top-k rows from a partition (i.e., group) of rows of a table tab 1, that may include many partitions of rows. An example of the statement is shown below. The following top-k query (Q1) selects values f, i, d (i.e., SELECT) for the one (i.e., LIMIT 1) most recent d (i.e., ORDER BY) for each partition of i (i.e. PARTITION BY) from the table tab1 (i.e. FROM). In other words, top-k query Q1 retrieves value f of the oldest timestamp d for each partition i from the table tab1.

Top-K Query Statement
Q1: SELECT f, i, d FROM tab1 LIMIT 1 OVER (PARTITION BY i ORDER BY d);

According to an example, table tab1 may include the data shown below in TABLE 1 after a first load of input data.

TABLE 1

| id | f | i | C | v | D |
| --- | --- | --- | --- | --- | --- |
| 1 | 10 | 100 | 'c' | 'cat' | '2014-01-20' |
| 2 | 11 | 101 | 'd' | 'dog' | '2014-01-15' |
| 3 | 15 | 100 | 'c' | 'cow' | '2014-01-15' |
| 4 | 17 | 101 | 'b' | 'bat' | 2012-11-01' |

If the top-k query Q1 is run on the input data shown in TABLE 1, intermediate data representing different partitions of same values in column i is shown below in TABLE 2. As shown in TABLE 2, the data of the three columns (f, i, d) are partitioned or divided by partitions of same values in column i (e.g., 100 and 101), and each partition is sorted by d.

TABLE 2

| f | i | d |
| --- | --- | --- |
| 15 | 100 | '2014-01-15' |
| 10 | 100 | '2014-01-20' |
| 17 | 101 | 2012-11-01' |
| 11 | 101 | '2014-01-15' |

The result of the top-k query Q1 includes one top row for each partition. For instance, the top-k query Q1 retrieves one top row of the oldest timestamp d for each partition 1 (e.g., 100 and 101). The resulting data is shown below in TABLE 3.

TABLE 3

| f | i | d |
| --- | --- | --- |
| 15 | 100 | '2014-01-15' |
| 17 | 101 | 2012-11-01' |

According to an example, a top-k projection may be created and populated with pre-computed top-k result data for each partition of rows table tab1 using the top-k query statement discussed above. Particularly, the top-k projection that stores the result data specified in the top-k query Q1 may be defined as follows:

Top-K Projection Creation Statement
CREATE PROJECTION projection_name AS [Top-K Query]

In other words, the top-k projection creation statement may be further expanded as follows:
CREATE PROJECTION projection_name AS
SELECT expressions FROM table_name
LIMIT a_number OVER (PARTITION BY expressions ORDER BY expressions);

Accordingly, using the above discussed examples of table tab1 and top-k query Q1, the top-k projection named topk1 may be defined by the following statement:
CREATE PROJECTION topk1 AS
SELECT i, d, f FROM tab1 LIMIT 1 OVER (PARTITION BY i ORDER BY d);

The top-k query or function specified for projection topk1 creates columns for the top-k projection to store the results of the top-k query partitioned by the column(s) specified in the creation statement. In an example, the top-k projection is automatically partitioned on expressions in the PARTITION BY clause, and is automatically sorted on expressions in the PARTITION BY clause. For example, the expressions of the ORDER BY clause of the OVER clause is used to order each individual partition defined in the PARTITION BY clause.

Also, in an example, if the expression in the PARTITION BY clause of the table of the projection is not included in the top-k projection, it will be added automatically into the top-k projection when the projection is created but invisible to the users. For example, table tab1 is partitioned by the year of column d. Thus, the top-k projection statement CREATE PROJECTION topk1 AS SELECT i, d, f FROM tab1 LIMIT 1 OVER (PARTITION BY i ORDER BY d) may be considered as the following top-k projection statement CREATE PROJECTION topk2 AS SELECT EXTRACT (YEAR FROM d) d_year, i, d, f FROM tab1 LIMIT 1 OVER (PARTITION BY EXTRACT (YEAR FROM d), i ORDER BY d).

However, the user who creates the top-k projection does not see the column EXTRACT(YEAR FROM d) in both the SELECT clause and PARTITION BY clause of the top-k projection creation statement. This implicitly added expression does not affect the partition and sort order of the top-k projection. It is still partitioned on and ordered by column i.

Figure 3:
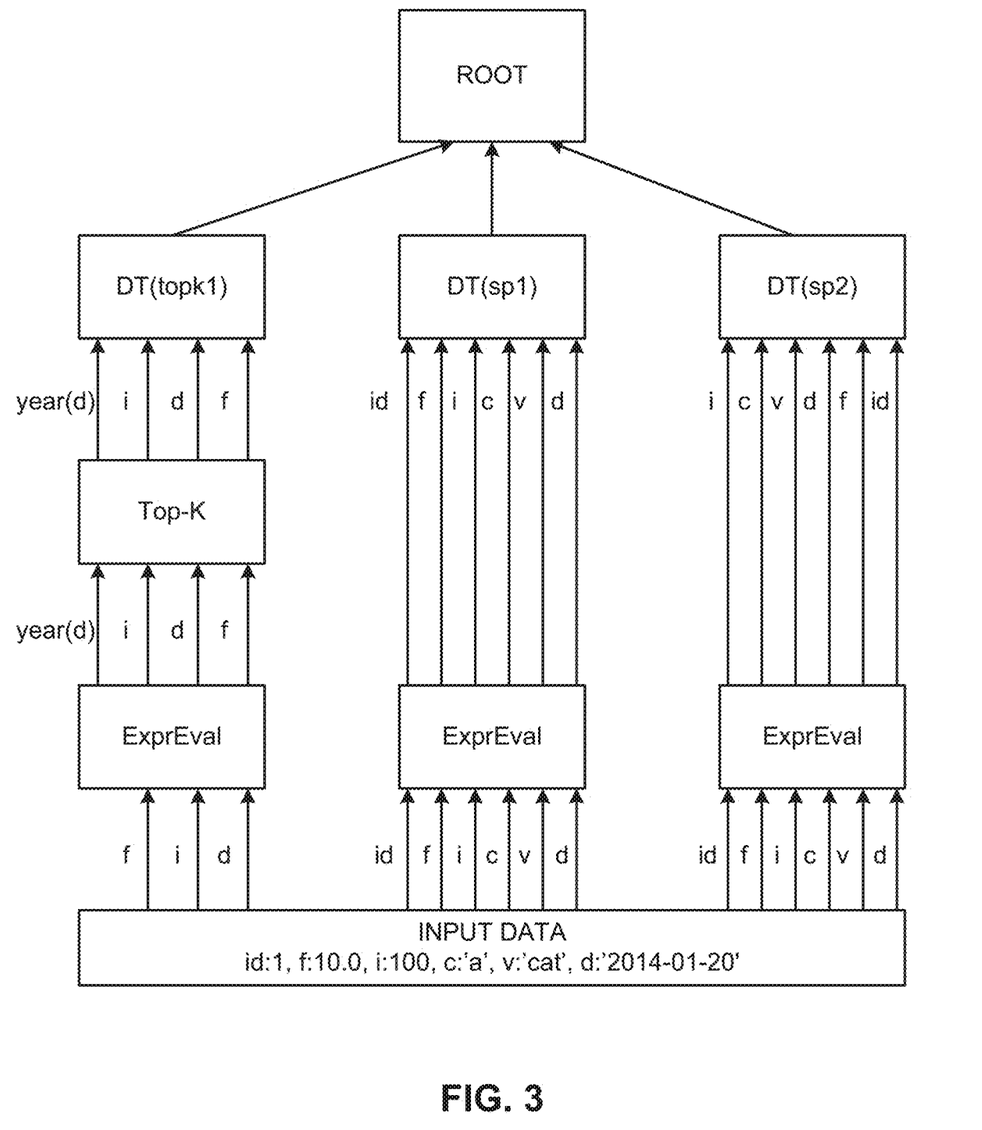
FIG. 3 shows examples of loading data into super projections and top-k projections.

FIG. 3 illustrates the execution of the following insert query: INSERT INTO tab1 VALUES (1, 10.0, 100, 'c', 'cat', '2014-01-20'). The columns of input data are in the order of the columns in table tab1, which is [id, f, i, c, v, d]. The ExprEval operators below the data targets (DTs) of super projections, DT(sp1) and DT(sp2), redirect data to the column order of the projection columns of sp1 and sp2 respectively. The ExprEval operator below the data target of top-k projection, however, redirects data to a Top-K operator to compute a top-k function that retrieves the top-k rows of values from each partition of rows of table tab1. The resulting data from the top-k function is output to data target DT(topk1). The expression year(d) belongs to an implicitly added column, and split data into its year-based partition. The root operator at the top of FIG. 3 may return a number of rows executed by the operators below it.

As shown in TABLE 1 above, the input data from FIG. 3 may be bulk-loaded into table tab1. The input data includes four rows in the example in TABLE 1. The actual data of the input data shown in TABLE 1 is stored in projections sp1 and sp2. TABLE 4 shows the data of sp1 and sp2 after the first load. The columns shown in TABLE 4 are in the order of sp2, and sp1 has the columns ordered as i, c, v, d, f, id after the ExprEval for sp1.

TABLE 4

| Storage Container | id | f | i | c | v | d |
|---|---|---|---|---|---|---|
| 1 | 4 | 17 | 101 | 'b' | 'bat' | 2012-11-01' |
| 2 | 2 | 11 | 101 | 'd' | 'dog' | '2014-01-15' |
|   | 1 | 10 | 100 | 'c' | 'cat' | '2014-01-20' |
|   | 3 | 15 | 100 | 'c' | 'cow' | '2014-01-15' |

TABLE 4 includes two different physical storage containers, each represents a partition of the same year of column d.

TABLE 5 shows the top-k data of the first load for the top-k projection topk1 after the ExprEval operator and Top-K operator are executed for the top-k projection. Even though the top-k projection is partitioned by same values in column i, their actual PARTITION BY expressions are (year(d), i) as explained above. According to an example, all rows with the same year(d) are in the same physical storage container.

TABLE 5

| year(d) | i | d | f |
|---|---|---|---|
| 2014 | 100 | '2014-01-15' | 15 |
| 2012 | 101 | '2012-11-01' | 17 |

For top-k projections, according to an example, the top-k function is implemented on the inserted data, and the pre-existing data in the top-k projections is not combined with the inserted data. TABLE 6 shows the data set of a second load (e.g., three rows of data).

TABLE 6

| id | f | i | c | v | d |
|---|---|---|---|---|---|
| 5 | 20 | 100 | 'c' | 'cat' | '2014-01-20' |
| 6 | 5 | 101 | 'd' | 'dog' | '2014-01-15' |
| 7 | 25 | 100 | 'c' | 'cow' | '2014-01-15' |

For TABLES 7 and 8 illustrate the data stored in projections sp1, sp2, topk1 respectively after the second load. The boldface data is from the second load.

TABLE 7

| Storage Container | id | f | i | c | v | d |
|---|---|---|---|---|---|---|
| 1 | 4 | 17 | 101 | 'b' | 'bat' | 2012-11-01' |
| 2 | 2 | 11 | 101 | 'd' | 'dog' | '2014-01-15' |
|   | 1 | 10 | 100 | 'c' | 'cat' | '2014-01-20' |
|   | 3 | 15 | 100 | 'c' | 'cow' | '2014-01-15' |
|   | 5 | 20 | 100 | 'c' | 'cat' | '2014-01-20' |
|   | 6 | 5 | 101 | 'd' | 'dog' | '2014-01-15' |
|   | 7 | 25 | 100 | 'c' | 'cow' | '2014-01-15' |

TABLE 8

| year(d) | i | d | f |
|---|---|---|---|
| 2014 | 100 | '2014-01-15' | 15 |
| 2014 | 100 | '2014-01-15' | 25 |
| 2014 | 101 | '2014-01-15' | 5 |
| 2012 | 101 | '2012-11-01' | 17 |

As shown in TABLES 7 and 8, the data of the first and second load in the top-k projection are not combined together. One benefit of this strategy is that the data storage system 100 does not have to read existing data while loading new data, but the side effect is the data stored in top-k projection is not completely top-k. To make the partially top-k data invisible to users, we run the top-k query or function again at a SELECT step. For example, when a user selects data from the top-k projection, the top-k projection calculates the top-k rows for each partition of the top-k projection and returns the result to the user. For example, if a user issues the following command: SELECT * FROM topk1, the actually plan executed looks like the plan of this query: SELECT i, d, f FROM topk1 LIMIT 1 OVER (PARTITION BY i ORDER BY d); and the return data is shown in the two rows of TABLE 9 below.

TABLE 9

| i | d | f |
|---|---|---|
| 100 | '2014-01-15' | 15 |
| 101 | '2012-11-01' | 17 |

When a table has a top-k projection, users may be disallowed from updating its data. Similar to an update command, a delete command may not be allowed on tables with top-k projections. However, users can drop the whole partition of that table. As discussed above, the partition expression of the table by year may be implicitly added into the top-k projection. Data of different partitions is stored in different containers. Also, when a partition is removed (e.g., SELECT DROP PARTITION ('tab1', 2012), all of its corresponding containers are removed without updating or touching other containers.

According to an example, each time data is inserted into a table, the data is loaded into new files. After a while, there are many files which can slow down the reading process. To avoid too many files in the data storage system 100, MERGE OUT merges data from different files of a column to one file. For a top-k projection, all the data is combined again during merge-out to determine the final merged result with top-k data.

If a projection is created for a table that already has data, a refresh is done to copy appropriate data into the newly created projection. If the new projection is a top-k projection, its refreshed data is either copied from an available top-k projection with the same definition or recomputed from its table's super projection.

Data recovery for a top-k projection after a node in its cluster is down and brought back up is similar to the refresh process. The data can be either copied from another top-k projection that is not affected by the node failure or recomputed from its table's super projection. If the latter happens, the top-k projection is recovered after its table's super projections.

Figure 4:
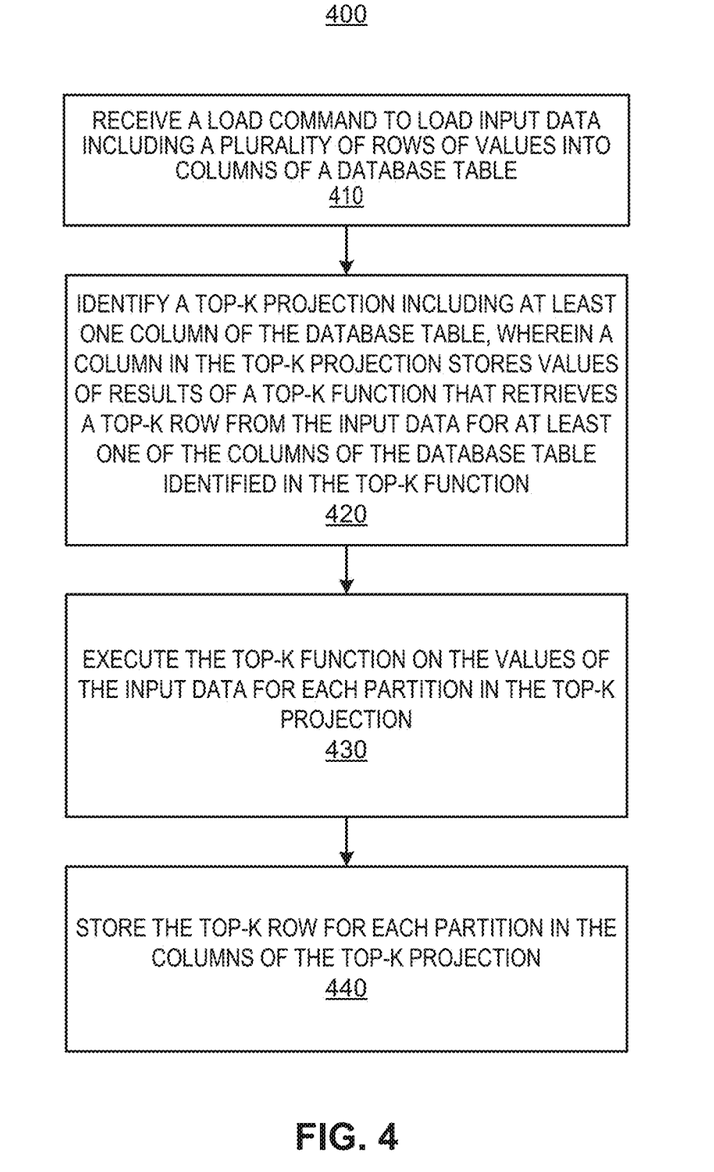
FIG. 4 shows a flow diagram of a method to load data into a top-k projection, according to an example of the present disclosure.
Figure 5:
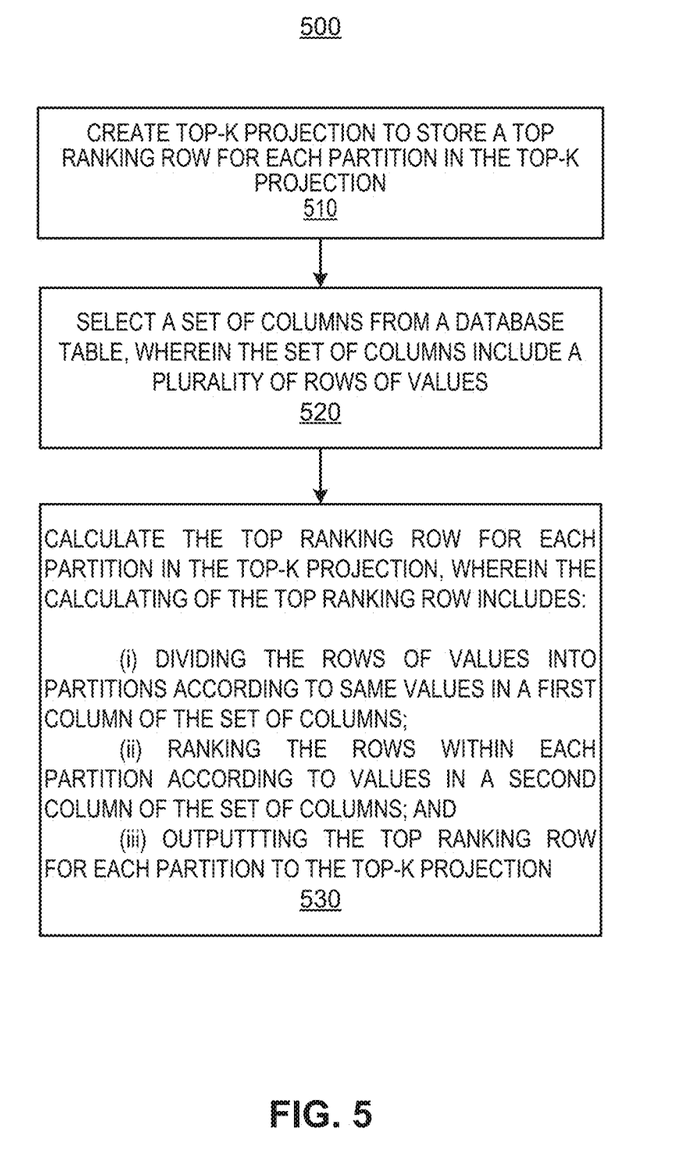
FIG. 5 shows a flow diagram of a method to create and populate a top-k projection, according to an example of the present disclosure.
Figure 6:
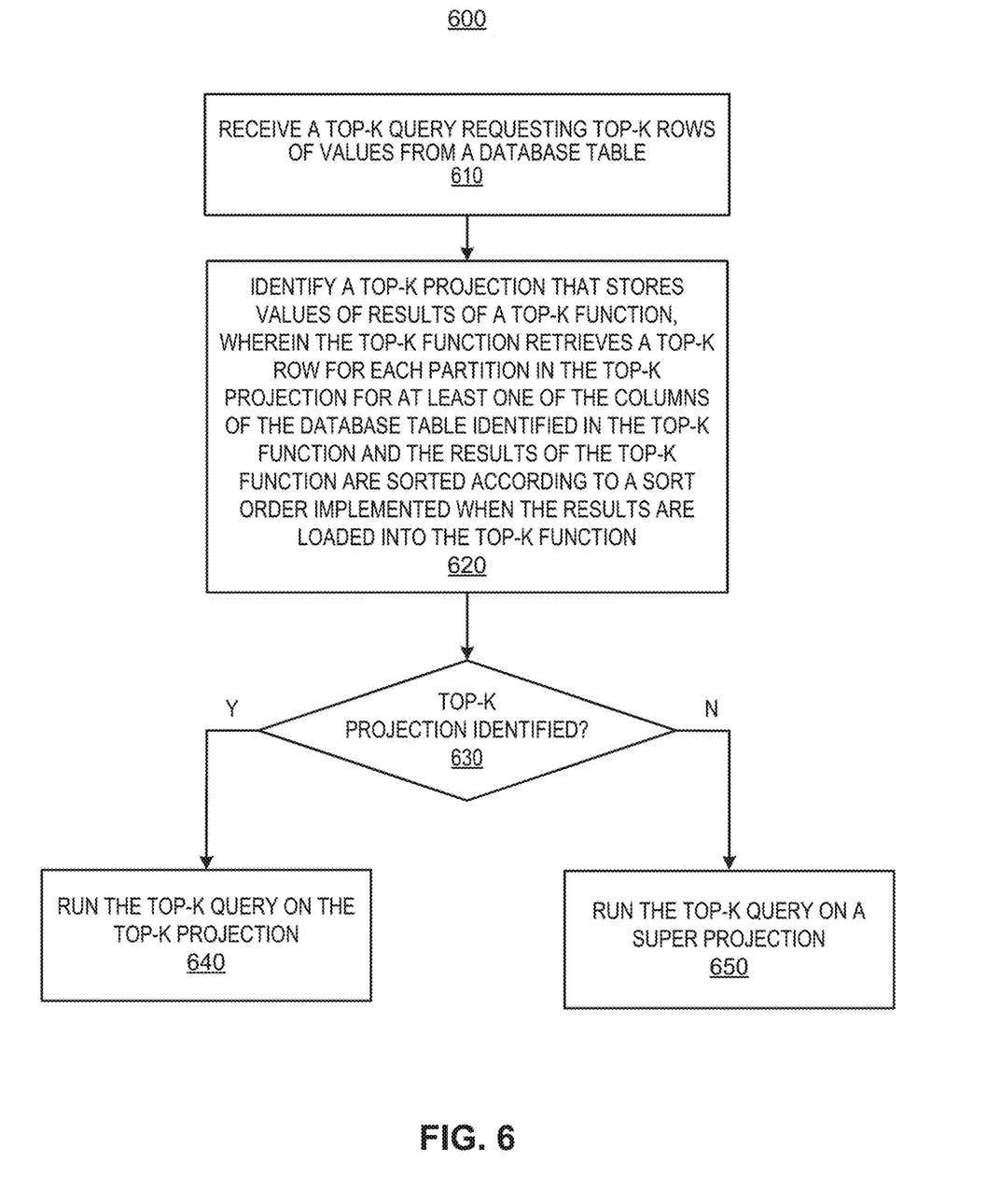
FIG. 6 shows a flow diagram of a method to query a top-k projection, according to an example of the present disclosure.

FIGS. 4-6 respectively depict flow diagrams of methods 400-600 for top-k projections according to examples of the present disclosure. It should be apparent to those of ordinary skill in the art that the methods 400-600 represent generalized illustrations and that other operations may be added or existing operations may be removed, modified or rearranged without departing from the scopes of the methods 400-600.

With reference to FIG. 4, there is shown a flow chart of a method 400 to load data into a top-k projection, according to an example of the present disclosure. The method 400 is implemented, for example, by the processor 202 of computer 200 as depicted in FIG. 2.

In block 410, the load management module 110, for instance, may receive a load command to load input data including a plurality of rows of values into columns of a database table. According to an example, the load command may include at least one of an insert command to load the input data row by row and a copy command to load a set of rows in bulk.

In block 420, the load management module 110, for instance, may identify a top-k projection including at least one column of the database table. A column in the top-k projection may store values of results of a top-k function. According to an example, the top-k function may retrieve a top-k row from the input data for at least one of the columns of the database table identified in the top-k function.

According to an example, the top-k projection may be identified by examining a projection catalog. The projection catalog may store information about a plurality of projections for the database table. Based on the information about the plurality of projections in the projection catalog, the input data is directed to either the top-k projection or another projection from the plurality of projections.

In block 430, the top-k function may be executed on the values of the input data for each partition in the top-k projection. According to an example, a partition is created to divide the plurality of rows based on same values in a first column of the top-k projection. As discussed above in TABLE 2, for instance, partitions are created for the same values of '100' and '101' in column i. The plurality of rows is then ranked within each partition according to values in a second column of the top-k projection. As discussed above in TABLE 2, for instance, the plurality of rows are then sorted according values in column d within each partition '100' or '101'. A top ranking row for each partition is then calculated; and outputted to the top-k projection.

According to an example, the data storage system 100 sorts the data (e.g., the input data and the top-k data) in the top-k projection. Sorting includes ordering the rows in the projection according to a criteria. For instance, the criteria for the sorting may be specified in the projection definition which may be used to create the top-k projection. In other examples, the sort criteria may be predetermined or input by the user outside the projection definition or provided by another system. In addition, the data in a particular column of the top-k projection may be sorted with respect to each or with respect to data in other columns. According to an example, the data in the top-k projection may be sorted to enhance, e.g. maximize, performance of queries on the results data. By way of example, the data in the top-k projection may be sorted to enable queries to run in a minimal amount of time. Furthermore, the data in the top-k projection remains sorted according to the sorting initially performed on the data when it is loaded into the projection. For example, new data may be loaded into the top-k projection. But the new data may not be combined with the pre-existing data in the top-k projection and then sorted. Instead, the pre-existing data remains in its previous sort order, and the new data is sorted without including the new data with the pre-existing data in the top-k projection. The pre-existing data in the top-k projection may be stored in a different physical container than the new data to keep the data separated.

The data in the top-k projection may be encoded. For instance, run-length encoding may be performed on the data to compress it. In other examples, other encoding techniques may be used. Also, the encoded data in the top-k projection may be segmented. Segmenting may be based on a hash function or another function to distribute data across different nodes. In one example, the segmenting provides substantially even distribution of the data in the projection across some or all of the nodes in a cluster for enhanced, e.g., optimal, query execution. Thus, the data in a top-k projection or any projection may be stored in one node or multiple nodes, and one or more copies of the data may be stored to provide redundancy in case of a failure of one of the nodes.

In block 440, the top-k row for each partition is stored in the columns of the top-k projection. Also, as discussed above, new input data may not be initially combined with data already stored in the top-k projection. When a SELECT command is received for the top-k projection, the top-k function may be executed on all the data in the top-k projection or on all the data in a partition in the top-k projection. Also, the data may be re-sorted. For example, all the data identified in response to the SELECT command may be sorted according to specified or predetermined criteria.

With reference to FIG. 5, there is shown a flow chart of a method 500 to create and populate a top-k projection, according to an example of the present disclosure. The method 500 is implemented, for example, by the processor 202 of computer 200 as depicted in FIG. 2.

In block 510, the projection manager 120, for instance, may create a top-k projection. According to an example, the top-k projection may store a top ranking row (i.e., a top-k row) for each partition in the top-k projection. Once the top-k projection is created, the top-k projection is then populated with top-k rows of data values.

For example, a set of columns may be selected from a database table. The set of columns include a plurality of rows of values as shown in block 520. According to a further example, an implicit partition column may automatically be added to the SQL statement that selects the set of columns from the database table. This implicit partition column may include the same values by which the database table was partitioned. As discussed above the benefit of the implicit partition column is that this column may easily be removed from the top-k projection in response to receiving a drop partition command to remove a partition of the database table.

In block 530, the top ranking row (i.e., top-k) for each partition in the top-k projection may be calculated. For instance, the rows of values may be divided into partitions according to same values in a first column of the set of columns. The rows within each partition may then be ranked according to values in a second column of the set of columns. Thus, the top ranking row for each partition may be outputted to the top-k projection.

According to an example, the calculating of the top ranking row is performed each time a user selects values from the top-k projection by merging the sorted data. According to further examples, the method 500 may receive a merge command to merge the plurality of rows of values from different files of a column in the database table and recalculate a top-ranking row for each partition in the top-k projection. The method 500 may receive a refresh command to request a plurality of rows to in a newly created top-k projection, wherein the selected plurality of rows is obtained by at least one of copying the requested plurality of rows from a top-k projection with a same definition and recalculating the selected plurality of rows from a super projection of the database table. The method 500 may also receive a recover command to request a plurality of rows to store in a top-k projection of a recovered node in a database storage system, wherein the selected plurality of rows is obtained by at least one of copying the requested plurality of rows from another top-k projection with a same definition and recalculating the selected plurality of rows from a super projection of the database table.

With reference to FIG. 6, there is shown a flow chart of a method 600 to query a top-k projection, according to an example of the present disclosure. The method 600 is implemented, for example, by the processor 202 of computer 200 as depicted in FIG. 2.

In block 610, the query engine 130, for instance, may receive a top-k query that requests the top-k rows of values from a database table. A top-k projection that stores values of results of a top-k function may then be identified. The top-k function may retrieve a top-k row for each partition in the top-k projection for at least one of the columns of the database table identified in the top-k function. According to an example, the identification of the top-k projection may be accomplished by referencing a projection catalog that stores information about a plurality of projections for the database table, and includes user, schema, database table, and projection information.

At block 630, a determination is made as to whether the top-k projection is identified from the plurality of projections for the database table. If the top-k projection is identified, then the top-k query is run on the top-k projection, as shown in block 640. As discussed above, the top-k query may select a set of columns from the database table, wherein the set of columns include rows of values. The top-k query may then divide the rows into a plurality of partitions according to same values in a first column of the set of columns, rank the rows within each partition according to values in a second column of the set of columns, calculate a top ranking row for each partition; and output the top ranking row for each partition in the top-k projection. If the top-k projection could not be identified, the top-k query may be run on a super projection according to an example.

Accordingly, when a query is received that is based on the top-k function, the results can be quickly provided to the user from the top-k projection. Thus, query execution performance is improved, i.e., faster. Execution of queries on the top-k projection may be faster than using indexes and database tables to execute the queries if the projections are optimized for the queries.

What has been described and illustrated herein are examples of the disclosure along with some variations. The terms, descriptions and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

What is claimed is:

1. A data storage system comprising:
    a data storage to store a plurality of projections associated with a database table; and
    at least one processor to:
        receive a load command to load input data including a plurality of rows of values into columns of the database table, the plurality of rows of values including a plurality of partitions;
        identify a top-k projection including at least one column of the database table;
        execute a top-k function on the input data to determine a predefined number of top ranking rows of values for each of the plurality of partitions;
        store the predefined number of top ranking rows of values for each of the plurality of partitions in at least one column of the top-k projection;
        receive a top-k query requesting top-k rows of values among the plurality of rows of values from the database table;
        run the top-k query on the top-k projection to retrieve the predefined number of top ranking rows of values for each of the plurality of partitions in the top-k projection responsive to determining that the top-k projection is associated with the top-k query;
        run the top-k query on a super projection responsive to determining that the top-k projection is not associated with the top-k query; and
        return query results responsive to running the top-k query.

2. The data storage system of claim 1, wherein to execute the top-k function, the at least one processor is to:
    create each of the plurality of partitions, wherein the plurality of partitions divide the plurality of rows of values based on same values in a first column of the top-k projection;
    rank the plurality of rows of values within each partition according to values in a second column of the top-k projection;
    calculate the predefined number of top ranking rows of values for each of the plurality of partitions; and
    output the predefined number of top ranking rows of values for each of the plurality of partitions in the top-k projection as values of results of execution of the top-k function for storing in the top-k projection.

3. The data storage system of claim 1, wherein to identify the top-k projection, the at least one processor is to:
    examine a projection catalog that stores information about the plurality of projections; and direct the input data to at least one of the top-k projection or another projection based on the information about the plurality of projections in the projection catalog.

4. The data storage system of claim 1, wherein the at least one processor is to:
sort results of the execution of the top-k function in the top-k projection;
receive a second load command to load new input data into the database table;
execute the top-k function on the new input data and not on data stored in the top-k projection prior to receiving the new input data, wherein the data stored in the top-k projection prior to receiving the new input data remains ordered according to the sort;
store results of the execution of the top-k function on the new input data in the top-k projection; and
sort the results of the execution of the top-k function on the new input data in the top-k projection.

5. The data storage system of claim 1, wherein the load command includes at least one of an insert command to load the input data row by row or a copy command to load a set of rows in bulk.

6. The data storage system of claim 1, wherein the at least one processor is to:
determine a predetermined limit corresponding to the predefined number of top ranking rows of values for each of the plurality of partitions to be stored in the at least one column of the top-k projection, the predetermined limit corresponding to a limit defined in the top-k query associated with the top-k projection.

7. The data storage system of claim 1, wherein the at least one processor is to:
create the super projection to include all columns of the database table; and
direct the input data to be loaded to the top-k projection and/or the super projection based on descriptions of the plurality of projections in a projection catalog, wherein the at least one processor loads the input data to the super projection for execution of queries that are not associated with the top-k projection.

8. A method to create and populate a top-k projection and run a top-k query, comprising:
creating, by a processor, a top-k projection to store results of execution of a top-k function that is associated with the top-k projection;
selecting a set of columns from a database table, wherein the set of columns include a plurality of rows of values;
calculating a predefined number of top ranking rows of values for each partition of a plurality of partitions in the top-k projection, wherein the calculating of the predefined number of top ranking rows of values includes:
dividing the plurality of rows of values into the plurality of partitions according to same values in a first column of the set of columns;
ranking the plurality of rows of values within each of the plurality of partitions according to values in a second column of the set of columns; and
outputting the predefined number of top ranking rows of values for each of the plurality of partitions to be saved in the top-k projection;
receiving a top-k query requesting top-k rows of values among the plurality of rows of values from the database table;
running the top-k query on the top-k projection to retrieve the predefined number of top ranking rows of values for each of the plurality of partitions in the top-k projection responsive to determining that the top-k projection is associated with the top-k query;
running the top-k query on a super projection responsive to determining that the top-k projection is not associated with the top-k query; and
returning query results responsive to running the top-k query.

9. The method of claim 8, wherein the calculating of the predefined number of top ranking rows of values is performed each time a user selects values from the top-k projection by merging sorted data.

10. The method of claim 8, wherein selecting the set of columns from the database table includes:
adding an implicit partition column to the selected set of columns from the database table, wherein the implicit partition column includes same values by which the database table was partitioned.

11. The method of claim 10, wherein the implicit partition column is removed from the top-k projection in response to receiving a drop partition command to remove a partition of the database table.

12. The method of claim 8, further including:
receiving a merge command to merge the plurality of rows of values from different files of a column in the database table; and
recalculating the predefined number of top ranking rows of values for each partition in the top-k projection.

13. The method of claim 8, further including:
receiving a refresh command to request a plurality of rows of values to be refreshed in a newly created top-k projection, wherein the plurality of rows of values to be refreshed is obtained by at least one of copying the plurality of rows of values to be refreshed from a top-k projection with a same definition or recalculating the plurality of rows of values to be refreshed from the super projection of the database table.

14. The method of claim 8, further including:
receiving a recover command to request a plurality of rows of values to store in a top-k projection of a recovered node in a database storage system, wherein the requested plurality of rows of values to store are obtained by at least one of copying the requested plurality of rows of values to store from another top-k projection with a same definition or recalculating the requested plurality of rows of values to store from the super projection of the database table.

15. The method of claim 8, further comprising:
determining a predetermined limit corresponding to the predefined number of top ranking rows of values for each of the plurality of partitions to be stored in the set of columns, the predetermined limit corresponding to a limit defined in the top-k query associated with the top-k projection.

16. The method of claim 8, further comprising:
creating the super projection to include all columns of the database table; and
populating data in the top-k projection and/or the super projection based on descriptions of the top-k projection and/or the super projection in a projection catalog, wherein the data is populated in the super projection for execution of queries that are not associated with the top-k projection.

17. A non-transitory computer readable medium to query a top-k projection, including machine readable instructions executable by a processor to:

receive a load command to load input data including a plurality of rows of values into columns of a database table, the plurality of rows of values including a plurality of partitions;

identify a top-k projection including at least one column of the database table;

execute a top-k function on the input data to determine a predefined number of top ranking rows of values for each of the plurality of partitions;

store the predefined number of top ranking rows of values for each of the plurality of partitions in at least one column of the top-k projection;

receive a top-k query requesting top-k rows of values among the plurality of rows of values from the database table;

identify the top-k projection associated with the top-k query;

run the top-k query on the top-k projection to retrieve the predefined number of top ranking rows of values for each of a plurality of partitions in the top-k projection when the top-k projection associated with the top-k query is identified;

run the top-k query on a super projection when the top-k projection associated with the top-k query is not identified; and return query results responsive to running the top-k query.

18. The non-transitory computer readable medium of claim 17, wherein to identify the top-k projection associated with the top-k query, the machine readable instructions are executable by the processor to:

reference a projection catalog that stores information about a plurality of projections for the database table, wherein the information includes user, schema, database table, and projection information.

19. The non-transitory computer readable medium of claim 17, wherein to run the top-k query, the machine readable instructions are executable by the processor to:

select a set of columns from the database table, wherein the set of columns include the plurality of rows of values;

divide the plurality of rows of values into the plurality of partitions according to same values in a first column of the set of columns;

rank the plurality of rows of values within each of the plurality of partitions according to values in a second column of the set of columns;

calculate the predefined number of top ranking rows of values for each of the plurality of partitions; and output the predefined number of top ranking rows for each of the plurality of partitions to be saved in the top-k projection.

20. The non-transitory computer readable medium of claim 17, wherein the processor is to:

determine a predetermined limit corresponding to the predefined number of top ranking rows of values for each of the plurality of partitions to be stored in the at least one column of the top-k projection, the predetermined limit corresponding to a limit defined in the top-k query associated with the top-k projection.

* * * * *